(12) United States Patent
Hajjaj et al.

(10) Patent No.: US 11,274,983 B2
(45) Date of Patent: Mar. 15, 2022

(54) ELECTROMECHANICAL PRESSURE SENSOR

(71) Applicant: KING ABDULLAH UNIVERSITY OF SCIENCE AND TECHNOLOGY, Thuwal (SA)

(72) Inventors: Amal Hajjaj, Thuwal (SA); Md Abdullah Al Hafiz, Thuwal (SA); Mohammad Ibrahim Younis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 214 days.

(21) Appl. No.: 16/625,521

(22) PCT Filed: Jun. 15, 2018

(86) PCT No.: PCT/IB2018/054430
§ 371 (c)(1),
(2) Date: Dec. 20, 2019

(87) PCT Pub. No.: WO2019/021073
PCT Pub. Date: Jan. 31, 2019

(65) Prior Publication Data
US 2021/0140841 A1    May 13, 2021

Related U.S. Application Data

(60) Provisional application No. 62/677,418, filed on May 29, 2018, provisional application No. 62/536,074, filed on Jul. 24, 2017.

(51) Int. Cl.
*G01L 9/00* (2006.01)
*G01L 19/00* (2006.01)

(52) U.S. Cl.
CPC .......... *G01L 9/001* (2013.01); *G01L 19/0069* (2013.01)

(58) Field of Classification Search
CPC ....................................... G01L 9/001
See application file for complete search history.

(56) References Cited

U.S. PATENT DOCUMENTS 3,010,322 A    11/1961  Holmes
2006/0158484 A1*  7/2006  Greywall ............. B41J 2/14
                                                   347/56

(Continued)

OTHER PUBLICATIONS

Jiao, H. et al., "Electrostatically Driven and Capacitively Detected Differential Lateral Resonant Pressure Microsensor," Micro & Nano Letters, Nov. 11, 2013, vol. 8, Issue 10, pp. 650-653, Institution of Engineering and Technology.

(Continued)

*Primary Examiner* — Alexander A Mercado
(74) *Attorney, Agent, or Firm* — Patent Portfolio Builders PLLC (57) ABSTRACT

An electromechanical pressure sensor includes an electromechanical resonator having a driving electrode, a sensing electrode, and a beam resonator arranged between the driving and sensing electrodes. The beam resonator includes a resonator beam coupled on a first end to a first fixed anchor and coupled on a second end to a fixed second fixed anchor. The electromechanical resonator also includes a first voltage source coupled to the driving electrode and configured to provide an alternating current to the driving electrode and a second voltage source coupled to the first fixed anchor. The second voltage source provides a DC bias to the resonator beam. The electromechanical resonator further includes a third voltage source coupled to the resonator beam via the first and second fixed anchors. The third voltage source is configured to supply a voltage to the resonator beam that (Continued)

results in a temperature differential between the resonator beam and the first and second fixed anchors. The electromechanical resonator also includes a processor coupled to the sensing electrode and configured to correlate a voltage on the sensing electrode with a pressure value.

18 Claims, 5 Drawing Sheets

(56) References Cited

U.S. PATENT DOCUMENTS

| | | | | |
|---|---|---|---|---|
| 2010/0154553 | A1* | 6/2010 | Phan Le | G01L 9/0022 73/727 |
| 2011/0111545 | A1* | 5/2011 | El-Gamal | B81C 1/00666 438/50 |
| 2012/0266686 | A1* | 10/2012 | Huffman | G01L 9/0013 73/826 |
| 2014/0202260 | A1 | 7/2014 | Nakamura | |
| 2014/0208857 | A1* | 7/2014 | Phan Le | G01L 11/04 73/702 |
| 2015/0047078 | A1* | 2/2015 | Sarkar | G01Q 20/04 850/1 |
| 2016/0006414 | A1* | 1/2016 | Chodavarapu | G01L 9/0042 310/309 |
| 2020/0407218 | A1* | 12/2020 | Chodavarapu | H03H 9/2436 |
| 2021/0140841 | A1* | 5/2021 | Hajjaj | G01L 9/0019 |

OTHER PUBLICATIONS

Bouchaala, A. et al., "A Smart Microelectromechanical Sensor and Switch Triggered by Gas," Applied Physics Letters, Jul. 5, 2016, vol. 109, pp. 013502-1-013502-4, AIP Publishing.

Chou, B.C.S. et al., "A Sensitive Pirani Vacuum Sensor and the Electrothermal SPICE Modelling," Sensors and Actuators A: Physical, May 1996, pp. 273-277, Elsevier.

Defaÿ, E. et al., "PZT Thin Films Integration for the Realisation of a High Sensitivity Pressure Microsensor Based on a Vibrating Membrane," Sensors and Actuators A: Physical, Apr. 30, 2002, vol. 99, pp. 64-47, Elsevier.

Hafiz, M.A.A. et al., "Microelectromechanical Reprogrammable Logic Device," Nature Communications, Mar. 29, 2016, vol. 7, Article No. 11137.

Hajjaj, A.Z. et al., "Highly Tunable Electrothermally and Electrostatically Actuated Resonators," Journal of Microelectromechanical Ssystems, Jun. 2016, vol. 25, No. 3, pp. 440-449, IEEE.

Hajjaj, A.Z. et al., "Mode Coupling and Nonlinear Resonances of MEMS Arch Resonators for Bandpass Filters," Scientific Reports, Jan. 30, 2017, vol. 7, Article No. 41820.

He X.L. et al., "Film Bulk Acoustic Resonator Pressure Sensor with Self Temperature Reference," Journal of Micromechanics and Microengineering, Oct. 25, 2012, vol. 22, No. 12, IOP Publishing.

International Search Report in corresponding/related International Application No. PCT/IB2018/054430, dated Oct. 15, 2018.

Kessler, Y. et al., "Flow Sensing by Buckling Monitoring of Electrothermally Actuated Double-Clamped Micro Beams," Applied Physics Letters, Aug. 25, 2016, vol. 109, pp. 083503-1-083503-4, AIP Publishing.

Khan, M.F. et al., "Pressure Modulated Changes in Resonance Frequency of Microchannel String Resonators," Applied Physics Letters, Jul. 9, 2014, vol. 105, pp. 013507-1-013507-5, AIP Publishing LLC.

Kim, D.H. et al., "Pressure-Sensing Based on Photothermally Coupled Operation of Micromechanical Beam Resonator," Applied Physics Letters, May 202013, vol. 102, Issue 20, pp. 203502-1-203502-4, AIP Publishing LLC.

Kimura, M. et al., "Proposal of a New Structural Thermal Vacuum Sensor with Diode-Thermistors Combined with a Micro-Air-Bridge Heater," Microelectronics Journal, Feb. 2007, vol. 38, Issue 2, pp. 171-176, Elsevier Ltd.

Mortet, V. et al., "Wide Range Pressure Sensor Based on a Piezoelectric Bimorph Microcantilever," Applied Physics Letters, Mar. 30, 2006, vol. 88, Issue 13, pp. 133511-1-133511-3.

Olfatnia, M. et al., "Piezoelectric Circular Microdiaphragm Based Pressure Sensors," Sensors and Actuators A: Physical, Jun. 18, 2010, vol. 163, pp. 32-26, Elsevier.

Robinson, A.M. et al., "A Thermal Conductivity Microstructural Pressure Sensor Fabricated in Standard Complementary Metal-Oxide Semiconductor," Review of Scientific Instruments, Mar. 1992, vol. 63, Issue 3.

Song, J.W. et al., "Design of a MEMS Piezoresistive Differential Pressure Sensor with Small Thermal Hysteresis for Air Data Modules," Review of Scientific Instruments, 2015, vol. 86, pp. 065003-1-065003-10.

Southworth, D.R. et al., "Pressure Dependent Resonant Frequency of Micromechanical Drumhead Resonators," Applied Physics Letters, May 27, 2009, vol. 94, Issue 21, pp. 213506-1-213506-3.

Stampfer, C. et al., "Fabrication of Single-Walled Carbon-Nanotube-Based Pressure Sensors," Nano Letters, Jan. 21, 2006, vol. 6, No. 2, pp. 233-237.

Vandeparre H. et al., "Extremely Robust and Conformable Capacitive Pressure Sensors Based on Flexible Polyurethan Foams and Stretchable Metallization," Applied Physics Letters, Nov. 14, 2013, vol. 103, Issue 20, pp. 204103-1-204103-4.

Woo, S.0J. et al., "A Thin All-Elastomeric Capacitive Pressure Sensor Array Based on Micro-Contact Printed Elastic Conductors," Journal of Materials Chemistry C, Mar. 25, 2014, vol. 2, pp. 4415-4422.

Written Opinion of the International Searching Authority in corresponding/related International Application No. PCT/IB2018/054430, dated Oct. 15, 2018.

Zhou, G. et al., "A Smart High Accuracy Silicon Piezoresistive Pressure Sensor Temperature Compensation System," Sensors, Jul. 8, 2014, vol. 14, No. 7, pp. 12174-12190.

Zhu, S.-E. et al., "Graphene Based Piezoresistive Pressure Sensor," Applied Physics Letters, Apr. 23, 2013, vol. 102, pp. 161904-1-161904-3, AIP Publishing LLC.

* cited by examiner

ELECTROMECHANICAL PRESSURE SENSOR

CROSS-REFERENCE TO RELATED APPLICATIONS

This application is a U.S. National Stage Application of International Application No. PCT/IB2018/054430, filed on Jun. 15, 2018, which claims priority to U.S. Provisional Patent Application No. 62/536,074, filed on Jul. 24, 2017, entitled "Scalable Pressor Sensor Based on Electrothermally Operated Resonator," and to U.S. Provisional Patent Application No. 62/677,418, filed on May 29, 2018, entitled "Electromechanical Pressure Sensor," the disclosures of which are incorporated herein by reference in their entirety.

BACKGROUND

Technical Field

Embodiments of the disclosed subject matter generally relate to an electromechanically pressure sensor having a resonator with a beam that is electrothermally heated.

Discussion of the Background

Pressure sensors are used to provide accurate estimation of the surrounding pressure in a variety of applications. Conventional pressures sensors, which are relatively bulky, include strain-gauge, capacitive, bridge resistors, and piezo-resistive pressure sensors.

There has been recent interest in alternative approaches for pressure sensing that avoid the bulkiness of conventional pressure sensors. Different techniques and designs have been explored to realize pressure sensors with improved sensitivity based on micro-sized diaphragms, carbon nanotubes, micromechanical drumhead resonators, microcantilever, and bridge resonators.

One recent approach has involved the use of lasers and a beam resonator. Specifically, an external laser source generates a laser beam that is directed onto a beam of a resonator, which causes a heating of the beam. Different ambient pressures cause different frequency shifts in the resonant frequency of the beam due to convective cooling of beam by the air surrounding the beam. Although this approach has produced a pressure sensor with greater sensitivity than conventional pressure sensors, the performance of the resonator beam-based pressure sensor depends on the resonator geometry and the external laser wavelength. Moreover, the resonant structure can only be miniaturized up to a certain level depending on the spot-size of the laser source used for the local heating of the beam.

Accordingly, it would be desirable to provide a pressure sensor that is less bulky than other sensors that does not depend upon resonator geometry and external laser wavelength, and which has a size that is not dependent upon the size of an externally generated laser beam.

SUMMARY

According to an embodiment, there is an electromechanical pressure sensor, which includes an electromechanical resonator, comprising a driving electrode, a sensing electrode, and a beam resonator arranged between the driving and sensing electrodes, wherein the beam resonator includes a resonator beam coupled on a first end to a first fixed anchor and coupled on a second end to a fixed second fixed anchor. The electromechanical resonator also includes a first voltage source coupled to the driving electrode and configured to provide an alternating current to the driving electrode and a second voltage source coupled to the first fixed anchor, wherein the second voltage source provides a DC bias to the resonator beam. The electromechanical resonator further includes a third voltage source coupled to the resonator beam via the first and second fixed anchors, wherein the third voltage source is configured to supply a voltage to the resonator beam that results in a temperature differential between the resonator beam and the first and second fixed anchors. The electromechanical resonator also includes a processor coupled to the sensing electrode and configured to correlate a voltage on the sensing electrode with a pressure value.

According to another embodiment, there is a method of producing an electromechanical pressure sensor. An electromechanical resonator is provided, which comprise a driving electrode, a sensing electrode, and a beam resonator arranged between the driving and sensing electrodes. The beam resonator includes a resonator beam coupled on a first end to a first fixed anchor and coupled on a second end to a fixed second fixed anchor. A first voltage source is coupled to the driving electrode. The first voltage source is configured to provide an alternating current to the driving electrode. A second voltage source is coupled to the first fixed anchor. The second voltage source provides a DC bias to the resonator beam. A third voltage source is coupled to the resonator beam. The third voltage source is configured to supply a voltage to the resonator beam that results in a temperature differential between the resonator beam and the first and second fixed anchors. A processor is coupled to the sensing electrode. The processor is configured to correlate a voltage on the sensing electrode with a pressure value.

According to a further embodiment, there is A method of determining pressure. An alternating current is applied to a driving electrode of an electromechanical resonator, which comprises the driving electrode, a sensing electrode, and a beam resonator arranged between the driving and sensing electrodes. The beam resonator includes a resonator beam coupled on a first end to a first fixed anchor and coupled on a second end to a fixed second fixed anchor. A DC bias voltage is applied to the first fixed anchor. The resonator beam is electrothermally heated. The pressure is determined by correlating a voltage on the sensing electrode with a pressure value.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and electromechanical resonators.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
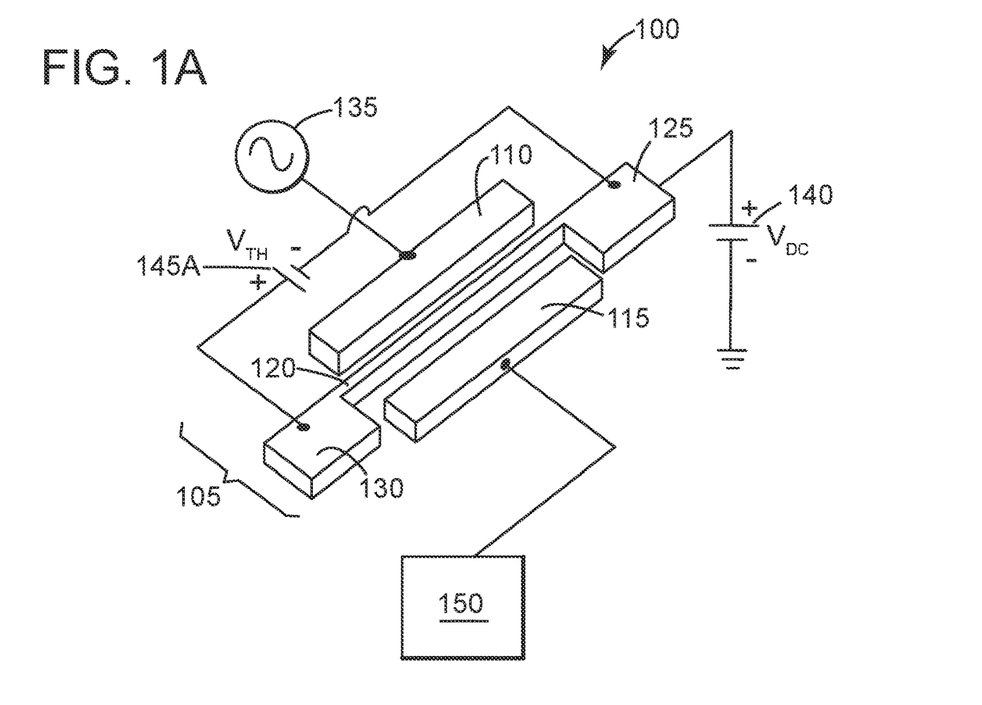
FIGS. 1A-1C are block diagrams of electromechanical pressure sensors having straight beam resonators according to embodiments.
Figure 1B:
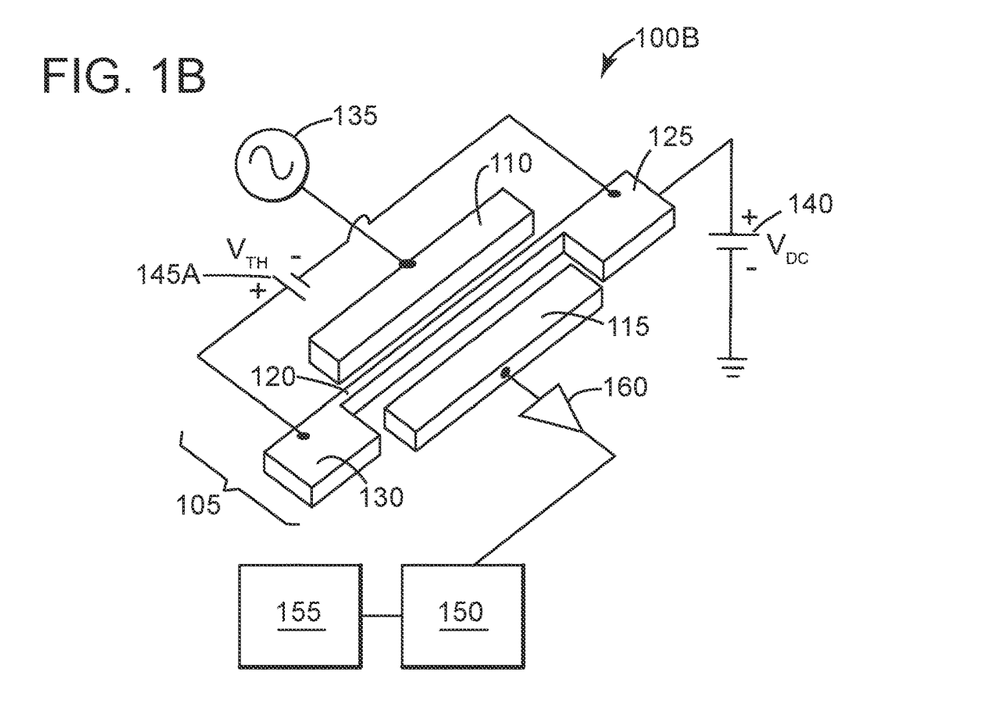
Figure 1C:
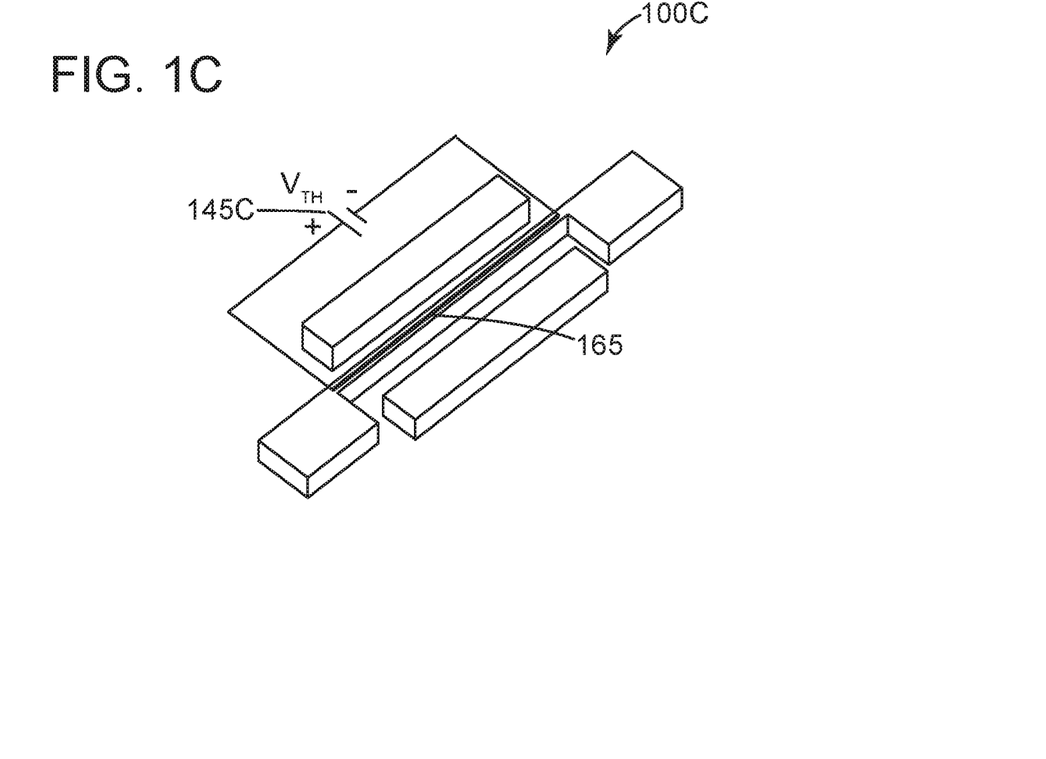

FIGS. 1A-1C are block diagrams of electromechanical pressure sensors having straight beam resonators according to embodiments. Referring initially to FIG. 1A, an electromechanical pressure sensor 100A includes an electromechanical resonator 105. The electromechanical resonator 105 comprises a driving electrode 110, sensing electrode 115, and a resonator beam 120 arranged between the driving 110 and sensing 115 electrodes. The resonator beam 120 is coupled on a first end to a first fixed anchor 125 and coupled on a second end to a fixed second fixed anchor 130. The resonator beam 120, first fixed anchor 125, and second fixed anchor 130 are collectively referred to as a beam resonator. A first voltage source 135 is coupled to the driving electrode 110. The first voltage source is configured to provide an alternating current to the driving electrode 110. A second voltage source 140 is coupled to the first fixed anchor 125. The second voltage source 140 provides a DC bias to the resonator beam 120. A third voltage source 145A (also labeled $V_{TH}$ in the figure) is coupled to the resonator beam 120 via the first 125 and second 130 fixed anchors. The third voltage source 135 is configured to supply a voltage to the resonator beam 120 that results in a temperature differential between the resonator beam 120 and the first 125 and second 130 fixed anchors. A processor 150 is coupled to the sensing electrode 115 and configured to correlate a voltage on the sensing electrode 115 with a pressure value.

As will be recognized by those skilled in the art, the first voltage source 135 connected to the driving electrode 110 is configured to excite a mechanical vibration on the beam 120 and the second voltage source 140 connected to first fixed anchor 125 is a bias voltage used to establish the required initial electric field.

The third voltage source 145A is intended to electrothermally heat the resonator beam 120, which is convectively cooled by surrounding the surrounding air. Specifically, for a straight beam prior to buckling, the surrounding air cools the resonator beam 120 due to heat dissipation, which decreases the stiffness of the resonator beam 120, and in turn decreases the resonant frequency of the resonator beam 120. After buckling of the straight resonator beam 120, the heat dissipation increases the stiffness of the beam, which in turn increases the resonant frequency of the resonator beam. The amount of convective cooling depends upon the ambient pressure and affects the resonant frequency of the beam 120. Thus, processor 150 can determine the ambient pressure based on the resonant frequency detected by sensing electrode 115.

In addition, as illustrated in FIG. 1B, the electromechanical pressure sensor 100B can include a memory 155 coupled to the processor 150. As discussed in more detail below, the memory 155 can include data representing a correlation of voltages (the amplitude of the voltages detected by the sensing electrode 115 correspond to different resonant frequencies) and pressure values. In order to increase the gain of the signal from the sensing electrode 115, an amplifier 165, such as a low noise amplifier, can be coupled between the sensing electrode 115 and processor 150.

Instead of electrothermally heating the resonator beam 120 by applying a voltage directly to the resonator beam 120, a heater 165 can be arranged on the resonator beam 120 and connected to a third voltage source 145C. An example of an electromechanical pressure sensor 100C having a heater 165 is illustrated in FIG. 10.

In the embodiments illustrated in FIGS. 1A-1C, the resonator beam 120 can have, for example, dimensions of: length=700 μm (i.e., the distance of the beam 120 between the anchors 125 and 130), thickness=30 μm (i.e., the distance of the beam in the vertical direction), width=3 μm (i.e., the distance of the beam across the plane between the electrodes), and transduction gap=8 μm (i.e., the distance between the beam and the electrodes). It should be recognized that these dimensions are merely examples and that the invention can be implemented with a beam 120 having different dimensions.

Figure 2:
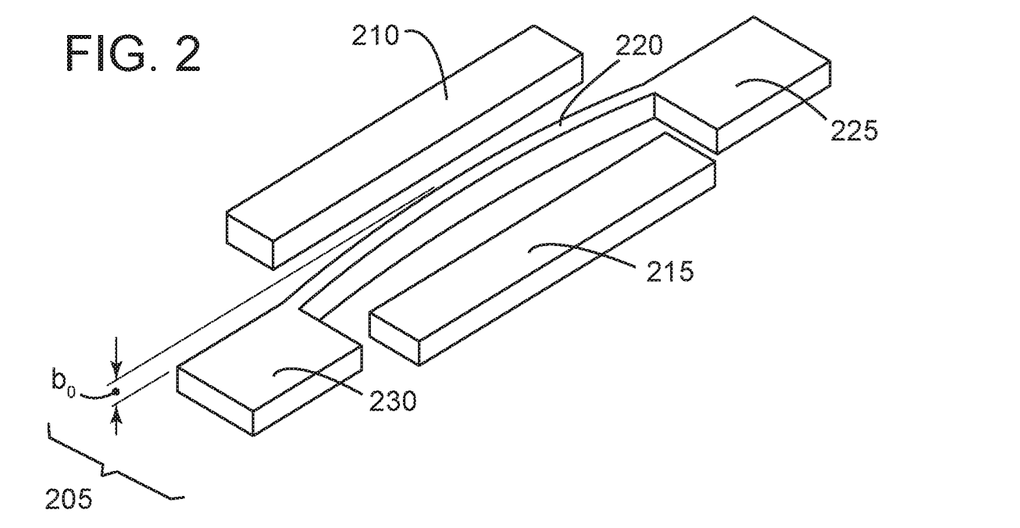
FIG. 2 is a block diagram of an electromechanical pressure sensor having a curved beam resonator according to an embodiment.

The embodiments illustrated in FIGS. 1A-1C employ a straight resonator beam. Other embodiments can employ a curved resonator beam (also referred to as an arch beam), an example of which is illustrated in FIG. 2. Specifically, an electromechanical resonator 205 includes a curved resonator beam 220 arranged between a sensing electrode 210 and driving electrode 215. The curved resonator beam 220 is coupled on a first end to a first fixed anchor 225 and coupled on a second end to a fixed second fixed anchor 230. The distance between the two dashed lines in FIG. 2, which is denoted in the figure as $b_0$, represents the initial rise at the midpoint of the resonator beam 220.

In the embodiment illustrated in FIG. 2, the resonator beam 220 can have, for example, dimensions of: length=700 μm (i.e., the distance of the beam 220 between the anchors 225 and 230), thickness=30 μm (i.e., the distance of the beam in the vertical direction), width=3 μm (i.e., the distance of the beam across the plane between the electrodes), an initial rise at the midpoint ($b_0$)=2 μm, and transduction gap=12 μm (i.e., the distance between the beam and the electrodes). It should be recognized that these dimensions are merely examples and that the invention can be implemented with a beam 220 having different dimensions. For example, the reasonable beam 220 can have, for example, dimensions of: length=800 μm (i.e., the distance of the beam 220 between the anchors 225 and 230), thickness=30 μm (i.e., the distance of the beam in the vertical direction), width=2 μm (i.e., the distance of the beam across the plane between the electrodes), an initial rise at the midpoint ($b_0$)=2

μm, and transduction gap=12 μm (i.e., the distance between the beam and the electrodes).

In contrast to the straight resonator beam 120, which experiences buckling at a certain point, the curved resonator beam 220 does not experience buckling. Accordingly, for the curved resonator beam 220, the resonance frequency increases monotonically with the thermal load due to the continuous increase in the beam curvature and beam stiffness.

For ease of illustration, the first, second, and third voltage sources are not illustrated in FIG. 2 but can be arranged in a similar manner to the discussion of the straight resonator beam in FIGS. 1A and 1B. Similarly, the electromechanical resonator 205 can include a heater connected to a third voltage source in a similar manner to that described above in connection with FIG. 10.

Figure 3:
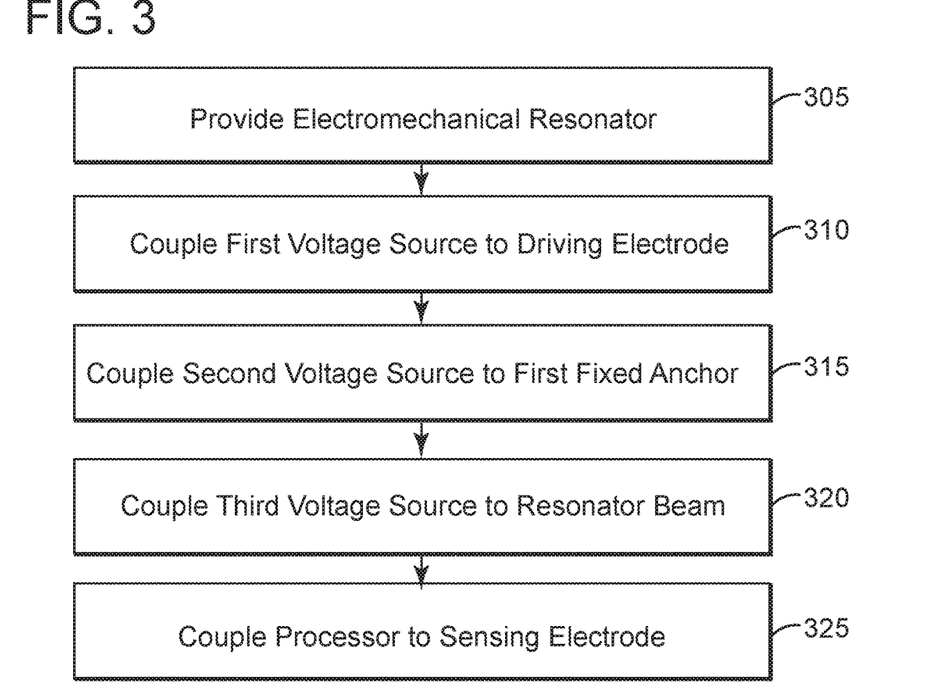
FIG. 3 is a flow diagram of a method of producing an electromechanical pressure sensor according to an embodiment.

A method of producing an electromechanical pressure sensor according to an embodiment will now be described in connection with FIGS. 1A and 3. Initially, an electromechanical resonator 105 is provided, which includes a driving electrode 110, sensing electrode 115, and a resonator beam 120 arranged between the driving 110 and sensing 115 electrodes (step 305). The resonator beam 120 is coupled on a first end to a first fixed anchor 125 and coupled on a second end to a fixed second fixed anchor 130. The electromechanical resonator 105 can be produced, for example, on a highly conductive 30 μm silicon device layer of a silicon-on-insulator (SOI) wafer by two-mask process using standard photo-lithography, electron beam evaporation, deep reactive ion etch (DRIE), and vapor hydrofluoric acid (vapor-HF) etch. It should be recognized that the electromechanical resonator can be produced using materials other than silicon, depending upon the thermal and electrical properties of the other materials, such as carbon nanotubes and graphene.

A first voltage source 135 is coupled to the driving electrode 110 (step 310). The first voltage source 135 is configured to provide an alternating current to the driving electrode 110. A second voltage source 140 is coupled to the first fixed anchor 125 (step 315). The second voltage source 140 provides a DC bias to the resonator beam 120.

A third voltage source 145A is coupled to the resonator beam 120 (step 320). The third voltage source 145A is configured to supply a voltage to the resonator beam 120 that results in a temperature differential between the resonator beam 120 and the first 125 and second 130 fixed anchors. A processor 150 is coupled to the sensing electrode 115 (step 325). The processor 150 is configured to correlate a voltage on the sensing electrode 115 with a pressure value.

Figure 4A:
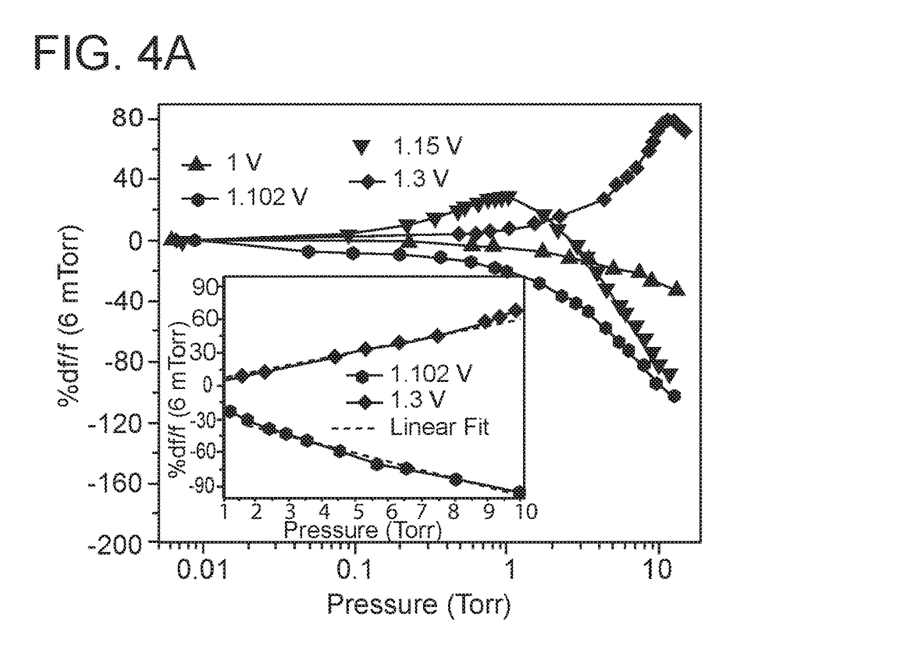
FIG. 4A is a graph illustrating the response of an electromechanical resonator having a straight beam to different voltages according to an embodiment.

As discussed above, the frequency response of an electromechanical resonator having a straight beam differs depending upon whether or not the beam has reached its buckling point, i.e., as the heat dissipation increases, the resonant frequency decreases prior to buckling and the resonant frequency increases after buckling. The inventors have realized that a straight beam resonator is most sensitive to pressure variations close to the beam's buckling point, which is illustrated in FIG. 4A. FIG. 4A illustrates a graph of normalized percentage shifts of resonance frequency for different voltage values applied by the third voltage source $V_{TH}$ to the beam of a straight beam resonator having a length of 700 μm, thickness of 30 μm, width of 3 μm, and transduction gap of 8 μm. The difference in resonance frequency is calculated by taking the difference between the frequency at 6 mTorr and the values of frequency for different pressures.

The straight beam resonator buckles, at vacuum conditions, when the voltage applied by the third voltage source $V_{TH}$ to the beam is approximately 1.102 V. Accordingly, the graph of FIG. 4A illustrates four different voltages applied by the third voltage source $V_{TH}$ to the beam, 1 V, 1.102 V, 1.15V, and 1.3 V. The voltage 1.15 V exhibits buckling behavior at approximately 1 Torr, which is undesirable because there will be pressure values between 0 and 10 Torr on either side of the buckling point that produce the same resonant frequency, thus leading to an ambiguity in the measurement.

The voltages of 1V, 1.102V, and 1.3 V do not exhibit buckling at pressure values between 0 and 10 Torr, and thus these voltages can be used to detect pressures in this range without the measurement ambiguity of a voltage value of 1.15V. However, as illustrated in FIG. 4A, the voltage values closest to those at which buckling occurs at vacuum conditions, result in greater sensitivity than voltage values further away from those at which buckling occurs at vacuum conditions, i.e., the percentage of change at 1.102 V (a voltage value before buckling occurs at vacuum conditions) and at 1.3 V (a voltage value after buckling occurs at vacuum conditions) over the pressure range of 0-10 Torr is much greater than the percentage of change at 1 V. Specifically, at 1 V, the normalized percentage shift over the pressure range of 0-10 Torr is approximately 40%, whereas it is almost 100% at a voltage of 1.102 V and approximately 60% at a voltage of 1.3 V (see the inset graph of FIG. 4A). Thus, a voltage of 1.102 V has a sensitivity equal to 51,390 ppm/mbar over the pressure range of 1 to 10 Torr and a voltage of 1.3 V has a sensitivity of 57,811 ppm/mbar over the pressure range of 1 to 10 Torr, which is seventeen times higher than the normalized sensitivity of a conventional micro-diaphragm-based pressure sensor (i.e., 3,256 ppm/mbar). Thus, the closer the voltage value is to the point at which buckling occurs at vacuum conditions, the greater the sensitivity, which is reflected in FIG. 4A by the voltage values exhibiting a frequency decrease having greatest slope.

Figure 4B:
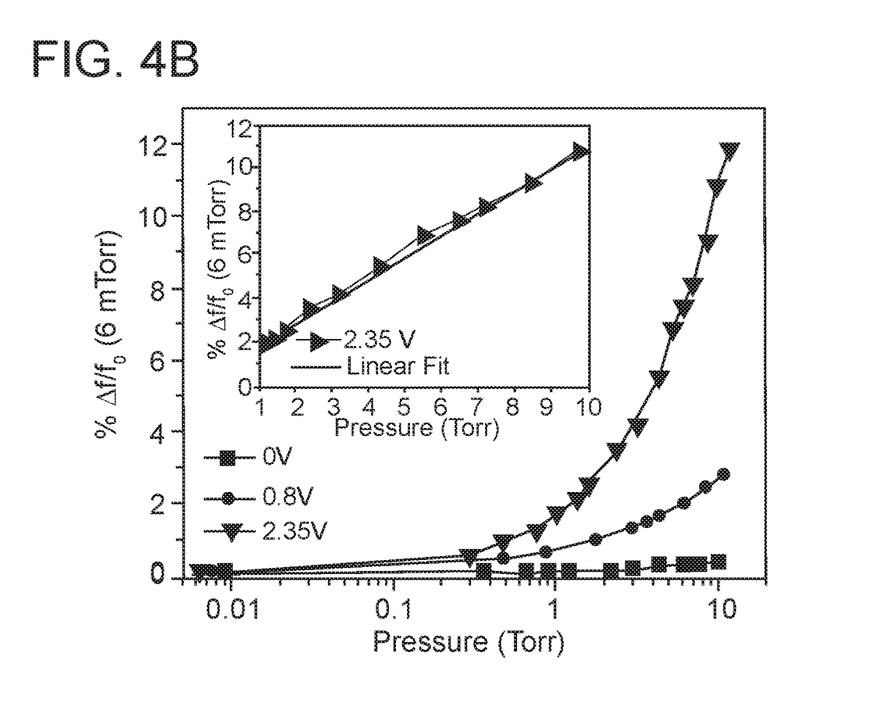
FIG. 4B is a graph illustrating the response of an electromechanical resonator having a curved beam to different voltages according to an embodiment.

As also discussed above, unlike a straight beam, a curved beam does not experience buckling. Accordingly, maximum sensitivity of a curved beam is evaluated differently than for the straight beam. FIG. 4B illustrates a graph of normalized percentage shifts of resonance frequency for different voltage values applied by the third voltage source $V_{TH}$ to the beam of a curved beam resonator having a length of 700 μm, thickness of 30 μm, width of 3 μm, initial rise at the midpoint ($b_0$) of 2 μm, and transduction gap of 12 μm. The graph in FIG. 4B illustrates the shifts for voltage values applied by the third voltage source $V_{TH}$ to the curved beam of 0 V, 0.8 V, and 2.35 V. As illustrated, the normalized shift of the frequency with the pressure for the curved beam resonator is highly dependent on and sensitive to the voltage values applied by the third voltage source $V_{TH}$ to the curved beam. Specifically, the greater the voltage applied by the third voltage source $V_{TH}$ to the curved beam, the more sensitive the beam is to changes in pressure. The sensitivity to the pressure of the curved resonator, in the range from 1 to 10 Torr, is 7862 ppm/mbar at $V_{TH}$=2.3V, when normalized with the frequency at 1 Torr. This sensitivity is significantly lower than that of the straight beam having the same size, when driven with a voltage close to the buckling point at vacuum conditions.

Figure 4C:
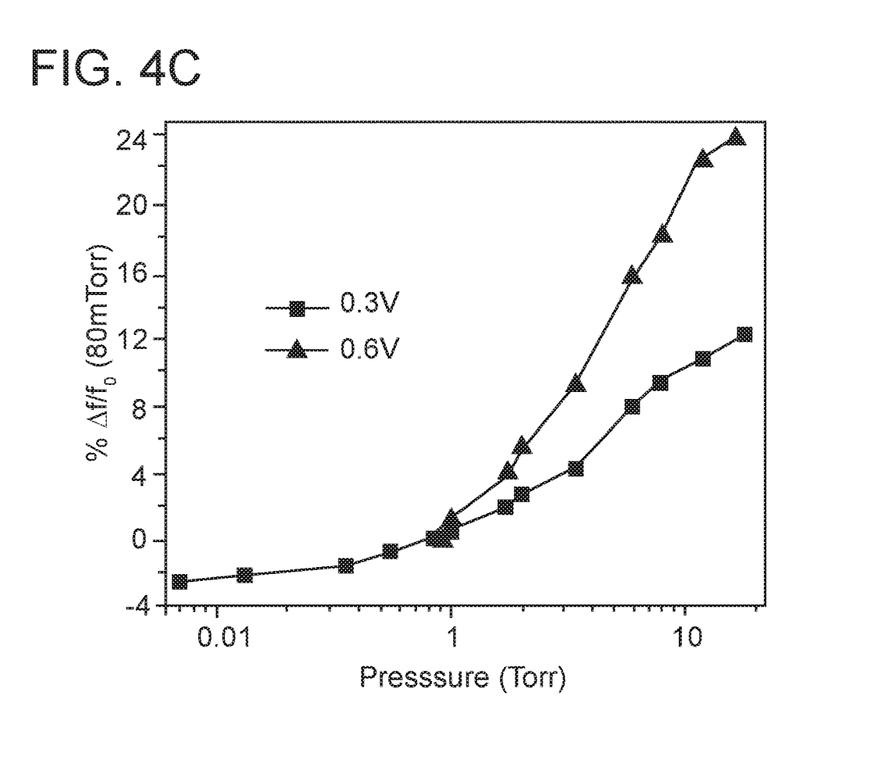
FIG. 4C is a graph illustrating the response of an electromechanical resonator having a curved beam to different voltages according to an embodiment.

In order to evaluate the size of the curved beam on sensitivity, a longer and less wide curved beam was evaluated, which has a length of 800 μm, thickness of 30 μm, width of 2 μm, and $b_0$=2 μm. The results of this evaluation are illustrated in the graph of FIG. 4C. As illustrated, when the voltage applied by the third voltage source $V_{TH}$ to the curved beam is 0.3 V, the sensitivity is 12,655 ppm/mbar and when the voltage applied by the third voltage source $V_{TH}$ to the curved beam is 0.6 V, the sensitivity is 24,634 ppm/mbar, which is eight times higher than the normalized sensitivity of a conventional micro-diaphragm-based pressure sensor (i.e., 3,256 ppm/mbar).

As will be appreciated from the discussion above in connection with FIGS. 4A-4C, the straight beam driven with a voltage that is close to buckling at vacuum conditions is much sensitive than the curved beam. This is due to the high sensitivity of the beam to a small variation of its stiffness in that region. Moreover, it was noted that the percentage resonance changes are much larger than the percentage change of resistance, which indicates that monitoring resonances lead to higher sensitivity.

As also will be appreciated from the discussion above in connection with FIGS. 4A-4C, the correlation between the voltage detected by the sensing electrode and the sensed pressure depends upon the value of the voltage applied by the third voltage source $V_{TH}$ to the beam. Accordingly, the processor bases the correlation between the voltage on the sensing electrode and the sensed pressure on the voltage value applied by the third voltage source $V_{TH}$ to the beam and this can be accounted for in the correlation stored in the memory.

It should be noted that the pressure range is dependent on the voltage applied by the third voltage source $V_{TH}$ to the beam. A higher voltage $V_{TH}$ heats the beam more and hence more air volume (more pressure) is needed to cool down the beam.

Figure 5:
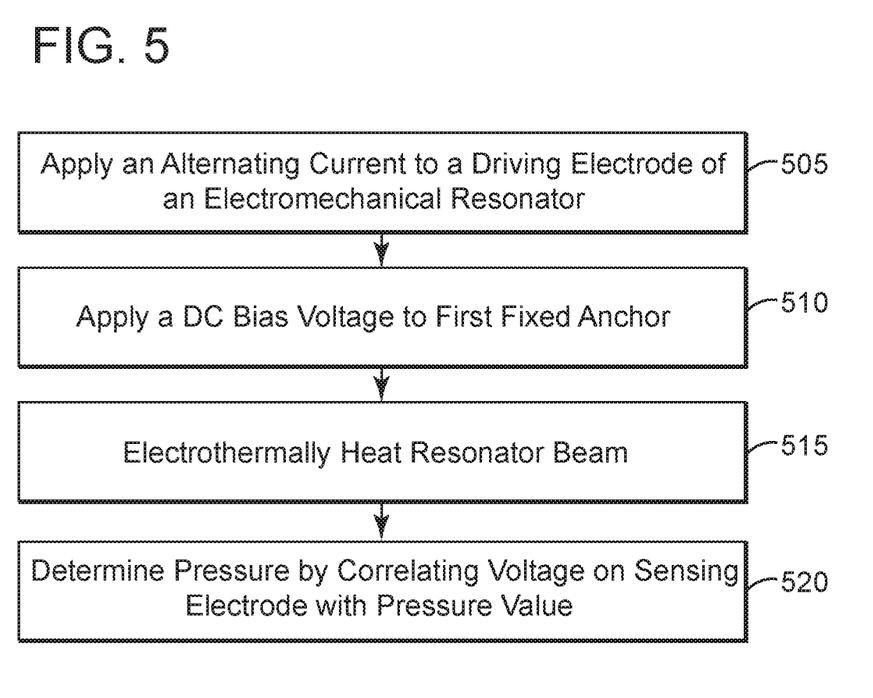
FIG. 5 is a flow diagram of a method of determining pressure using an electromechanical resonator according to an embodiment.

A method of determining pressure using an electromechanical pressure sensor according to an embodiment will now be described in connection with FIGS. 1A and 5. Initially, an alternating current is applied to a driving electrode 110 of an electromechanical resonator 105 (step 505). The electromechanical resonator 105 includes the driving electrode 110, a sensing electrode 115, and a resonator beam 120 arranged between the driving 110 and sensing 115 electrodes. The resonator beam 120 is coupled on a first end to a first fixed anchor 125 and coupled on a second end to a fixed second fixed anchor 130.

Next, a DC bias voltage is applied to the first fixed anchor 130 (step 510). The resonator beam 120 is electrothermally heated (step 515) and the pressure is determined by correlating a voltage on the sensing electrode 115 with a pressure value (step 520). As discussed above, the electromechanical pressure sensor can include a memory storing data correlating a sensed voltage with a corresponding pressure value. Accordingly, this correlation data can be used to determine a pressure value based on the sensed voltage.

Those skilled in the art will recognize that manufacturing imperfections often result in the resonance frequency of resonator beams produced using the same method and having the same dimensions will often be slightly different. Accordingly, if very high precision is required for the sensed pressure, the correlation data used to determine a pressure value based on a sensed voltage can be determined by testing each resonator beam and individually generating the correlation data for each tested beam. If lower precision is acceptable, the individual testing to generate the correlation data can be omitted. Moreover, instead of generating correlation data based on testing of each resonator beam, the resonator beams can be individually tested, and the bias voltage value applied by the second voltage source can be used to align the resonance frequency of the beams so that all of the beams can use common correlation data.

As will be appreciated from the discussion above, the disclosed pressure sensor advantageously provides high sensitivity. Further advantages include simplicity of fabrication, operation, and sensing scheme, lower power consumption, and scalability.

Although embodiments have been described above in connection with electromechanical resonators having dimensions in the nanometer range (i.e., a nanoelectromechanical resonator), the present invention can also employ electromechanical resonators in the millimeter range (i.e., a microelectromechanical resonator). In either case, the electromechanical resonators can be produced using the same standard fabrication processes. In contrast, conventional pressure sensors using a beam resonator heated using an external laser can only be miniaturized up to a certain level depending on the spot-size of the laser source used for the local heating of the beam. Thus, the disclosed pressure sensors, which employ local electrothermal heating of the beam are not subject to the size limitations of these conventional pressure sensors.

The disclosed embodiments provide an electromechanical pressure sensor having a beam that is locally electrothermally heated. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An electromechanical pressure sensor, comprising:
    an electromechanical resonator, comprising a driving electrode, a sensing electrode, and a beam resonator arranged between the driving and sensing electrodes, wherein the beam resonator includes a resonator beam coupled on a first end to a first fixed anchor and coupled on a second end to a fixed second fixed anchor;
    a first voltage source coupled to the driving electrode and configured to provide an alternating current to the driving electrode;
    a second voltage source coupled to the first fixed anchor, wherein the second voltage source provides a DC bias to the resonator beam;
    a third voltage source coupled to the resonator beam via the first and second fixed anchors, wherein the third voltage source is configured to supply a voltage to the resonator beam that results in a temperature differential between the resonator beam and the first and second fixed anchors; and a processor coupled to the sensing electrode and configured to correlate a voltage on the sensing electrode indicative of a shift in a resonance frequency of the resonator beam with a pressure value based on the voltage supplied by the third voltage source.

2. The electromechanical pressure sensor of claim 1, wherein the resonator beam is straight.

3. The electromechanical pressure sensor of claim 1, wherein the resonator beam is curved.

4. The electromechanical pressure sensor of claim 1, further comprising:
a memory coupled to the processor and storing a correlation of voltages on the sensing electrode and pressure values.

5. The electromechanical pressure sensor of claim 1, further comprising:
an amplifier arranged between the sensing electrode and the processor.

6. The electromechanical pressure sensor of claim 1, wherein the electromechanical resonator is a microelectromechanical resonator.

7. The electromechanical pressure sensor of claim 1, wherein the electromechanical resonator is a nanoelectromechanical resonator.

8. The electromechanical pressure sensor of claim 1, wherein the electromechanical resonator comprises silicon.

9. The electromechanical pressure sensor of claim 1, further comprising:
a heater coupled to the resonator beam.

10. A method of producing an electromechanical pressure sensor, the method comprising:
providing an electromechanical resonator, comprising a driving electrode, a sensing electrode, and a beam resonator arranged between the driving and sensing electrodes, wherein the beam resonator includes a resonator beam coupled on a first end to a first fixed anchor and coupled on a second end to a fixed second fixed anchor;
coupling a first voltage source to the driving electrode, wherein the first voltage source is configured to provide an alternating current to the driving electrode;
coupling a second voltage source to the first fixed anchor, wherein the second voltage source provides a DC bias to the resonator beam;
coupling a third voltage source to the resonator beam, wherein the third voltage source is configured to supply a voltage to the resonator beam that results in a temperature differential between the resonator beam and the first and second fixed anchors; and
coupling a processor to the sensing electrode, wherein the processor is configured to correlate a voltage on the sensing electrode indicative of a shift in a resonance frequency of the resonator beam with a pressure value based on the voltage supplied by the third voltage source.

11. The method of claim 10, wherein the resonator beam is straight.

12. The method of claim 10, wherein the resonator beam is curved.

13. The method of claim 10, further comprising:
coupling a memory to the processor, wherein the memory stores a correlation of voltages on the sensing electrode and pressure values.

14. A method of determining pressure, the method comprising:
applying an alternating current to a driving electrode of an electromechanical resonator, which comprises the driving electrode, a sensing electrode, and a beam resonator arranged between the driving and sensing electrodes, wherein the beam resonator includes a resonator beam coupled on a first end to a first fixed anchor and coupled on a second end to a fixed second fixed anchor;
applying a DC bias voltage to the first fixed anchor;
electrothermally heating the resonator beam with an additional voltage; and
determining the pressure by correlating a voltage on the sensing electrode indicative of a shift in a resonance frequency of the resonator beam with a pressure value based on the additional voltage.

15. The method of claim 14, wherein the correlation of the voltage on the sensing electrode with the pressure value comprises:
selecting the pressure value from a table having a correlation between different voltages on the sensing electrode and different pressure values.

16. The method of claim 14, wherein the electrothermal heating of the resonator beam with the additional voltage comprises: applying a DC voltage to a heater attached to the resonator beam, wherein the DC voltage is the additional voltage.

17. The method of claim 14, wherein the electrothermal heating of the resonator beam with the additional voltage comprises: applying a DC voltage to the first and second fixed anchors, wherein the DC voltage is the additional voltage.

18. The method of claim 17, wherein the DC voltage applied to the first and second fixed anchors is a DC voltage different from a voltage causing the middle the resonator beam to buckle at vacuum conditions.

* * * * *